(12) United States Patent
Lohr et al.

(10) Patent No.: US 7,818,647 B2
(45) Date of Patent: Oct. 19, 2010

(54) METHOD FOR SWITCHING BETWEEN ASYNCHRONOUS AND SYNCHRONOUS HARQ RETRANSMISSION MODE

(75) Inventors: Joachim Lohr, Darmstadt (DE); Eiko Seidel, Darmstadt (DE); Dragan Petrovic, Darmstadt (DE)

(73) Assignee: Panasonic Corporation, Osaka (JP)

( * ) Notice: Subject to any disclaimer, the term of this patent is extended or adjusted under 35 U.S.C. 154(b) by 694 days.

(21) Appl. No.: 10/586,724

(22) PCT Filed: Jan. 10, 2005

(86) PCT No.: PCT/EP2005/000144

§ 371 (c)(1),
(2), (4) Date: Sep. 24, 2007

(87) PCT Pub. No.: WO2005/071874

PCT Pub. Date: Aug. 4, 2005

(65) Prior Publication Data

US 2008/0133995 A1     Jun. 5, 2008

(30) Foreign Application Priority Data

Jan. 22, 2004     (EP) .................................. 04001396

(51) Int. Cl.
*H04L 1/18*     (2006.01)

(52) U.S. Cl. ....................................... 714/750; 370/473

(58) Field of Classification Search ......... 714/748–751; 370/329, 341, 230, 231, 235, 338
See application file for complete search history.

(56) References Cited

U.S. PATENT DOCUMENTS

| 2002/0053058 | A1 | 5/2002 | Lee et al. |
| 2002/0168945 | A1* | 11/2002 | Hwang et al. ................. 455/69 |
| 2002/0191544 | A1 | 12/2002 | Cheng et al. |

OTHER PUBLICATIONS

PCT International Search Report dated Mar. 23, 2005.
European Search Report dated Jul. 30, 2004.

\* cited by examiner

*Primary Examiner*—Guy J Lamarre
(74) *Attorney, Agent, or Firm*—Dickinson Wright PLLC

(57) ABSTRACT

The present invention relates to method for controlling the transmission timing of data retransmissions in a wireless communication system wherein a HARQ retransmission protocol, is used to retransmit data from a transmitting entity to a receiving entity via a data channel. Further the present invention relates to a base station, a mobile terminal and a communication system employing the present invention. To overcome problems resulting from synchronous retransmissions in interference critical situations, the present invention introduces additional feedback signaling to a new HARQ protocol. The new NACK-S indicates to the transmitting entity to stop the synchronously transmitting retransmissions but to await a scheduling assignment for the retransmission from the receiving entity instead.

25 Claims, 13 Drawing Sheets

METHOD FOR SWITCHING BETWEEN ASYNCHRONOUS AND SYNCHRONOUS HARQ RETRANSMISSION MODE

FIELD OF THE INVENTION

The present invention relates to a method for controlling the retransmission mode of data retransmissions in a wireless communication system, wherein a HARQ retransmission protocol is used to retransmit data from a transmitting entity to a receiving entity via a data channel. Further the present invention relates to a base station, a mobile terminal and a communication system employing the present invention.

TECHNICAL BACKGROUND

W-CDMA (Wideband Code Division Multiple Access) is a radio interface for IMT-2000 (International Mobile Communication), which was standardized for use as the $3^{rd}$ generation wireless mobile telecommunication system. It provides a variety of services such as voice services and multimedia mobile communication services in a flexible and efficient way. The standardization bodies in Japan, Europe, USA, and other countries have jointly organized a project called the $3^{rd}$ Generation Partnership Project (3GPP) to produce common radio interface specifications for W-CDMA.

The standardized European version of IMT-2000 is commonly called UMTS (Universal Mobile Telecommunication System). The first release of the specification of UMTS has been published in 1999 (Release 99). In the mean time several improvements to the standard have been standardized by the 3GPP in Release 4 and Release 5 and discussion on further improvements is ongoing under the scope of Release 6.

The dedicated channel (DCH) for downlink and uplink and the downlink shared channel (DSCH) have been defined in Release 99 and Release 4. In the following years, the developers recognized that for providing multimedia services—or data services in general—high speed asymmetric access had to be implemented. In Release 5 the high-speed downlink packet access (HSDPA) was introduced. The new high-speed downlink shared channel (HS-DSCH) provides downlink high-speed access to the user from the UMTS Radio Access Network (RAN) to the communication terminals, called user equipments in the UMTS specifications.

Hybrid ARQ Schemes

The most common technique for error detection of non-real time services is based on Automatic Repeat reQuest (ARQ) schemes, which are combined with Forward Error Correction (FEC), called Hybrid ARQ. If Cyclic Redundancy Check (CRC) detects an error, the receiver requests the transmitter to send additional bits or a new data packet. From different existing schemes the stop-and-wait (SAW) and selective-repeat (SR) continuous ARQ are most often used in mobile communication.

A data unit will be encoded before transmission. Depending on the bits that are retransmitted three different types of ARQ may be defined.

In HARQ Type I the erroneous data packets received, also called PDUs (Packet Data Unit) are discarded and new copy of that PDU is retransmitted and decoded separately. There is no combining of earlier and later versions of that PDU. Using HARQ Type II the erroneous PDU that needs to be retransmitted is not discarded, but is combined with some incremental redundancy bits provided by the transmitter for subsequent decoding. Retransmitted PDU sometimes have higher coding rates and are combined at the receiver with the stored values. That means that only little redundancy is added in each retransmission.

Finally, HARQ Type III is almost the same packet retransmission scheme as Type II and only differs in that every retransmitted PDU is self-decodable. This implies that the PDU is decodable without the combination with previous PDUs. In case some PDUs are heavily damaged such that almost no information is reusable self decodable packets can be advantageously used.

When employing chase-combining the retransmission packets carry identical symbols. In this case the multiple received packets are combined either by a symbol-by-symbol or by a bit-by-bit basis (see D. Chase: "Code combining: A maximum-likelihood decoding approach for combining an arbitrary number of noisy packets", IEEE Transactions on Communications, Col. COM-33, pages 385 to 393, May 1985). These combined values are stored in the soft buffers of respective HARQ processes.

Packet Scheduling

Packet scheduling may be a radio resource management algorithm used for allocating transmission opportunities and transmission formats to the users admitted to a shared medium. Scheduling may be used in packet based mobile radio networks in combination with adaptive modulation and coding to maximize throughput/capacity by e.g. allocating transmission opportunities to the users in favorable channel conditions. The packet data service in UMTS may be applicable for the interactive and background traffic classes, though it may also be used for streaming services. Traffic belonging to the interactive and background classes is treated as non real time (NRT) traffic and is controlled by the packet scheduler. The packet scheduling methodologies can be characterized by:

Scheduling period/frequency: The period over which users are scheduled ahead in time.
Serve order: The order in which users are served, e.g. random order (round robin) or according to channel quality (C/I or throughput based).
Allocation method: The criterion for allocating resources, e.g. same data amount or same power/code/time resources for all queued users per allocation interval.

The packet scheduler for uplink is distributed between Radio Network Controller (RNC) and user equipment in 3GPP UMTS R99/R4/R5. On the uplink, the air interface resource to be shared by different users is the total received power at a Node B, and consequently the task of the scheduler is to allocate the power among the user equipment(s)—In current UMTS R99/R4/R5 specifications the RNC controls the maximum rate/power a user equipment is allowed to transmit during uplink transmission by allocating a set of different transport formats (modulation scheme, code rate, etc.) to each user equipment.

The establishment and reconfiguration of such a TFCS (transport format combination set) may be accomplished using Radio Resource Control (RRC) messaging between RNC and user equipment. The user equipment is allowed to autonomously choose among the allocated transport format combinations based on its own status e.g. available power and buffer status. In current UMTS R99/R4/R5 specifications there is no control on time imposed on the uplink user equipment transmissions. The scheduler may e.g. operate on transmission time interval basis.

UMTS Architecture

The high level R99/4/5 architecture of Universal Mobile Telecommunication System (UMTS) is shown in FIG. 1 (see 3GPP TR 25.401: "UTRAN Overall Description", available from http://www.3gpp.org). The network elements are functionally grouped into the Core Network (CN) 101, the UMTS Terrestrial Radio Access Network (UTRAN) 102 and the User Equipment (UE) 103. The UTRAN 102 is responsible for handling all radio-related functionality, while the CN 101 is responsible for routing calls and data connections to external networks. The interconnections of these network elements are defined by open interfaces (Iu, Uu). It should be noted that UMTS system is modular and it is therefore possible to have several network elements of the same type.

FIG. 2 illustrates the current architecture of UTRAN. A number of Radio Network Controllers (RNCs) 201, 202 are connected to the CN 101. Each RNC 201, 202 controls one or several base stations (Node Bs) 203, 204, 205, 206, which in turn communicate with the user equipments. An RNC controlling several base stations is called Controlling RNC (C-RNC) for these base stations. A set of controlled base stations accompanied by their C-RNC is referred to as Radio Network Subsystem (RNS) 207, 208. For each connection between User Equipment and the UTRAN, one RNS is the Serving RNS (S-RNS). It maintains the so-called Iu connection with the Core Network (CN) 101. When required, the Drift RNS 302 (D-RNS) 302 supports the Serving RNS (S-RNS) 301 by providing radio resources as shown in FIG. 3. Respective RNCs are called Serving RNC (S-RNC) and Drift RNC (D-RNC). It is also possible and often the case that C-RNC and D-RNC are Identical and therefore abbreviations S-RNC or RNC are used.

Enhanced Uplink Dedicated Channel (E-DCH)

Uplink enhancements for Dedicated Transport Channels (DTCH) are currently studied by the 3GPP Technical Specification Group RAN (see 3GPP TR 25.896: "Feasibility Study for Enhanced Uplink for UTRA FDD (Release 6)", available at http://www.3gpp.org). Since the use of IP-based services become more important, there is an increasing demand to improve the coverage and throughput of the RAN as well as to reduce the delay of the uplink dedicated transport channels. Streaming, interactive and background services could benefit from this enhanced uplink.

One enhancement is the usage of adaptive modulation and coding schemes (AMC) in connection with Node B controlled scheduling, thus an enhancement of the Uu interface. In the existing R99/R4/R5 system the uplink maximum data rate control resides in the RNC. By relocating the scheduler in the Node B the latency introduced due to signaling on the interface between RNC and Node B may be reduced and thus the scheduler may be able to respond faster to temporal changes in the uplink load. This may reduce the overall latency in communications of the user equipment with the RAN. Therefore Node B controlled scheduling is capable of better controlling the uplink interference and smoothing the noise rise variance by allocating higher data rates quickly when the uplink load decreases and respectively by restricting the uplink data rates when the uplink load increases. The coverage and cell throughput may be improved by a better control of the uplink interference.

Another technique, which may be considered to reduce the delay on the uplink, is introducing a shorter TTI (Transmission Time Interval) length for the E-DCH compared to other transport channels. A transmission time interval length of 2 ms is currently investigated for use on the E-DCH, while a transmission time interval of 10 ms is commonly used on the other channels. Hybrid ARQ, which was one of the key technologies in HSDPA, is also considered for the enhanced uplink dedicated channel. The Hybrid ARQ protocol between a Node B and a user equipment allows for rapid retransmissions of erroneously received data units, and may thus reduce the number of RLC (Radio Link Control) retransmissions and the associated delays. This may improve the quality of service experienced by the end user.

To support enhancements described above, a new MAC sub-layer is introduced which will be called MAC-eu in the following (see 3GPP TSG RAN WG1, meeting #31, Tdoc R01-030284, "Scheduled and Autonomous Mode Operation for the Enhanced Uplink"). The entities of this new sub-layer, which will be described In more detail in the following sections, may be located in user equipment and Node B. On user equipment side, the MAC-eu performs the new task of multiplexing upper layer data (e.g. MAC-d) data into the new enhanced transport channels and operating HARQ protocol transmitting entities.

E-DCH MAC Architecture at the User Equipment

FIG. 4 shows the exemplary overall E-DCH MAC architecture on user equipment side. A new MAC functional entity, the MAC-eu 503, is added to the MAC architecture of Rel/99/4/5. The MAC-eu 503 entity is depicted in more detail in FIG. 5.

There are M different data flows (MAC-d) carrying data packets to be transmitted from user equipment to Node B. These data flows can have different QoS (Quality of Service), e.g. delay and error requirements, and may require different configurations of HARQ instances. Therefore the data packets can be stored in different Priority Queues. The set of HARQ transmitting and receiving entities, located in user equipment and Node B respectively will be referred to as HARQ process. The scheduler will consider QOS parameters in allocating HARQ processes to different priority queues. MAC-eu entity receives scheduling information from Node B (network side) via Layer 1 signaling.

E-DCH MAC Architecture at the UTRAN

In soft handover operation the MAC-eu entities in the E-DCH MAC Architecture at the UTRAN side may be distributed across Node B (MAC-eub) and S-RNC (MAC-eur). The scheduler in Node B chooses the active users and performs rate control by determining and signaling a commanded rate, suggested rate or TFC (Transport Format Combination) threshold that limits the active user (UE) to a subset of the TCFS (Transport Format Combination Set) allowed for transmission.

Every MAC-eu entity corresponds to a user (UE). In FIG. 6 the Node B MAC-eu architecture is depicted in more detail. It can be noted that each HARQ Receiver entity is assigned certain amount or area of the soft buffer memory for combining the bits of the packets from outstanding retransmissions. Once a packet is received successfully, it is forwarded to the reordering buffer providing the in-sequence delivery to upper layer. According to the depicted implementation, the reordering buffer resides in S-RNC during soft handover (see 3GPP TSG RAN WG 1, meeting #31: "HARQ Structure", Tdoc R1-030247, available of http://www.3gpp.org). In FIG. 7 the S-RNC MAC-eu architecture which comprises the reordering buffer of the corresponding user (UE) is shown. The number of reordering buffers is equal to the number of data flows in the corresponding MAC-eu entity on user equipment side. Data and control information is sent from all Node Bs within Active Set to S-RNC during soft handover.

It should be noted that the required soft buffer size depends on the used HARQ scheme, e.g. an HARQ scheme using incremental redundancy (IR) requires more soft buffer than one with chase combining (CC).

E-DCH Signaling

E-DCH associated control signaling required for the operation of a particular scheme consists of uplink and downlink signaling. The signaling depends on uplink enhancements being considered.

In order to enable Node B controlled scheduling (e.g. Node B controlled time and rate scheduling), user equipment has to send some request message on the uplink for transmitting data to the Node B. The request message may contain status information of a user equipment e.g. buffer status, power status, channel quality estimate. The request message is in the following referred to as Scheduling Information (SI). Based on this information a Node B can estimate the noise rise and schedule the UE. With a grant message sent in the downlink from the Node B to the UE, the Node B assigns the UE the TFCS with maximum data rate and the time interval, the UE is allowed to send. The grant message is in the following referred to as Scheduling Assignment (SA).

In the uplink user equipment has to signal Node B with a rate indicator message information that is necessary to decode the transmitted packets correctly, e.g. transport block size (TBS), modulation and coding scheme (MCS) level, etc. Furthermore, in case HARQ is used, the user equipment has to signal HARQ related control information (e.g. Hybrid ARQ process number, HARQ sequence number referred to as New Data Indicator (NDI) for UMTS Rel. 5, Redundancy version (RV), Rate matching parameters etc.)

After reception and decoding of transmitted packets on enhanced uplink dedicated channel (E-DCH) the Node B has to inform the user equipment if transmission was successful by respectively sending ACK/NAK in the downlink.

E-DCH—Node B Controlled Scheduling

Node B controlled scheduling is one of the technical features for E-DCH which is foreseen to enable more efficient use of the uplink power resource in order to provide a higher cell throughput in the uplink and to increase the coverage. The term "Node B controlled scheduling" denotes the possibility for the Node B to control, within the limits set by the RNC, the set of TFCs from which the UE may choose a suitable TFC. The set of TFCs from which the UE may choose autonomously a TFC is in the following referred to as "Node B controlled TFC subset". "Node B controlled TFC subset" is a subset of the TFCS configured by RNC as seen in FIG. 8. The UE selects a suitable TFC from the "Node B controlled TFC subset" employing the Rel5 TFC selection algorithm. Any TFC in the "Node B controlled TFC subset" might be selected by the UE, provided there is sufficient power margin, sufficient data available and TFC is not in the blocked state. Two fundamental approaches to scheduling UE transmission for the E-DCH exist. The scheduling schemes can all be viewed as management of the TFC selection in the UE and mainly differs in how the Node B can influence this process and the associated signaling requirements.

Node B Controlled Rate Scheduling

The principle of this scheduling approach is to allow Node B to control and restrict the transport format combination selection of the user equipment by fast TFCS restriction control. A Node B may expand/reduce the "Node B controlled subset", which user equipment can choose autonomously on suitable transport format combination from, by Layer-1 signaling. In Node B controlled rate scheduling all uplink transmissions may occur in parallel but at a rate low enough such that the noise rise threshold at the Node B is not exceeded. Hence, transmissions from different user equipments may overlap in time. With Rate scheduling a Node B can only restrict the uplink TFCS but does not have any control of the time when UEs are transmitting data on the E-DCH. Due to Node B being unaware of the number of UEs transmitting at the same time no precise control of the uplink noise rise in the cell may be possible (see 3GPP TR 25.896: "Feasibility study for Enhanced Uplink for UTRA FDD (Release 6)", version 1.0.0, available at http://www.3gpp.org).

Two new Layer-1 messages are introduced in order to enable the transport format combination control by Layer-1 signaling between the Node B and the user equipment. A Rate Request (RR) may be sent in the uplink by the user equipment to the Node B. With the RR the user equipment can request the Node B to expand/reduce the "Node controlled TFC Subset" by one step. Further, a Rate Grant (RG) may be sent in the downlink by the Node B to the user equipment. Using the RG, the Node B may change the "Node B controlled TFC Subset", e.g. by sending up/down commands. The new "Node B controlled TFC Subset" is valid until the next time it is updated.

Node B Controlled Rate and Time Scheduling

The basic principle of Node B controlled time and rate scheduling is to allow (theoretically only) a subset of the user equipments to transmit at a given time, such that the desired total noise rise at the Node B is not exceeded. Instead of sending up/down commands to expand/reduce the "Node B controlled TFC Subset" by one step, a Node B may update the transport format combination subset to any allowed value through explicit signaling, e.g. by sending a TFCS indicator (which could be a pointer).

Furthermore, a Node B may set the start time and the validity period a user equipment is allowed to transmit. Updates of the "Node B controlled TFC Subsets" for different user equipments may be coordinated by the scheduler in order to avoid transmissions from multiple user equipments overlapping in time to the extent possible. In the uplink of CDMA systems, simultaneous transmissions always interfere with each other. Therefore by controlling the number of user equipments, transmitting simultaneously data on the E-DCH, Node B may have more precise control of the uplink interference level in the cell.

The Node B scheduler may decide which user equipments are allowed to transmit and the corresponding TFCS indicator on a per transmission time interval (TTI) basis based on, for example, buffer status of the user equipment, power status of the user equipment and available interference Rise over Thermal (RoT) margin at the Node B.

Two new Layer-1 messages are introduced in order to support Node B controlled time and rate scheduling. A Scheduling Information Update (SI) may be sent in the uplink by the user equipment to the Node B. If user equipment finds a need for sending scheduling request to Node B (for example new data occurs in user equipment buffer), a user equipment may transmit required scheduling information. With this scheduling information the user equipment provides Node B information on its status, for example its buffer occupancy and available transmit power.

A Scheduling assignment (SA) may be transmitted in the downlink from a Node B to a user equipment. Upon receiving the scheduling request the Node B may schedule a user equipment based on the scheduling information (SI) and parameters like available RoT margin at the Node B. In the Scheduling Assignment (SA) the Node B may signal the TFCS indicator and subsequent transmission start time and validity period to be used by the user equipment.

Node B controlled time and rate scheduling provides a more precise RoT control compared to the rate-only controlled scheduling as already mentioned before. However this more precise control of the interference at this Node B is obtained at the cost of more signaling overhead and scheduling delay (scheduling request and scheduling assignment messages) compared to rate control scheduling.

In FIG. 9 a general scheduling procedure with Node B controlled time and rate scheduling is shown. When a user equipment wants to be scheduled for transmission of data on E-DCH it first sends a scheduling request to Node B. $T_{prop}$ denotes here the propagation time on the air interface. The contents of this scheduling request are information (scheduling information) for example buffer status and power status of the user equipment. Upon receiving that scheduling request, the Node B may process the obtained information and determine the scheduling assignment. The scheduling will require the processing time $T_{schedule}$.

The scheduling assignment, which comprises the TFCS indicator and the corresponding transmission start time and validity period, may be then transmitted in the downlink to the user equipment. After receiving the scheduling assignment the user equipment will start transmission on E-DCH in the assigned transmission time interval.

The use of either rate scheduling or time and rate scheduling may be restricted by the available power as the E-DCH will have to co-exist with a mix of other transmissions by the user equipments in the uplink. The co-existence of the different scheduling modes may provide flexibility in serving different traffic types. For example, traffic with small amount of data and/or higher priority such as TCP ACK/NACK may be sent using only a rate control mode with autonomous transmissions compared to using time and rate-control scheduling. The former would involve lower latency and lower signaling overhead.

E-DCH—Hybrid ARQ

Node B controlled Hybrid ARQ may allow rapid retransmissions of erroneously received data packets. Fast retransmissions between a user equipment and a Node B may reduce the number of higher layer retransmissions and the associated delays, thus the quality perceived by the end user may be improved.

A protocol structure with multiple stop-and-wait (SAW) Hybrid ARQ processes can be used for E-DCH, similar to the scheme employed for the downlink HS-DSCH in HSDPA, but with appropriate modifications motivated by the differences between uplink and downlink (see 3GPP TR 25.896).

An N-channel SAW scheme consists of N parallel HARQ process, each process works as a stop-and-wait retransmission protocols, which corresponds to a selective repeat ARQ (SR) with window size 1. It is assumed that user equipment can only transmit data on a single HARQ process each transmission time interval.

In FIG. 10 an example N-channel SAW protocol with N=3 HARQ processes is illustrated. A user equipment is transmitting data packet 1 on E-DCH on the uplink to the Node B. The transmission is carried out on the first HARQ process. After propagation delay of the air interface $T_{prop}$ the Node B receives the packet and starts demodulating and decoding. Depending on whether the decoding was successful an ACK/NACK is sent in the downlink to the user equipment.

In this example Node B sends an ACK after $T_{NBprocess}$, which denotes the time required for decoding and processing the received packet in Node B, to the user equipment. Based on the feedback on the downlink the user equipment decides whether it resends the data packet or transmits a new data packet. The processing time available for the user equipment between receiving the ACKnowledgement and transmitting the next transmission time interval in the same HARQ process is denoted $T_{UEprocess}$.

In the example user equipment transmits data packet 4 upon receiving the ACK. The round trip time (RTT) denotes the time between transmission of a data packet in the uplink and sending a retransmission of that packet or a new data packet upon receiving the ACK/NACK feedback for that packet. To avoid idle periods due to lack of available HARQ processes, it is necessary that the number N of HARQ processes matches to the HARQ round trip time (RTT).

Considering known and unknown transmission timing, it may be distinguished between synchronous and asynchronous data transmission. A retransmission protocol with asynchronous data transmission uses an explicit signaling to identify a data block or the HARQ process, whereas in a protocol with synchronous data transmission, a data block or HARQ process is identified based on the time point a data block is received.

A UE may for example have to signal the HARQ process number explicitly in a protocol with asynchronous data transmission in order to ensure correct soft combining of data packets in case of a retransmission. The advantage of a HARQ retransmission protocol with asynchronous data transmission is the flexibility, which is given to the system. The Node B scheduler may for example assign UEs a time period and HARQ processes for the transmission of data on the E-DCH based on the interference situation in the cell and further parameters like priority or QoS parameters of the corresponding E-DCH service.

A retransmission protocol with asynchronous HARQ feedback information uses sequence numbers (SN) or other explicit identification of the feedback messages whereas protocols with synchronous HARQ feedback information identifies the feedback messages based on the time when they are received, as for example in HSDPA. Feedback may be sent on the HS-DPCCH after a certain time instant upon having received the HS-DSCH (see 3GPP TR 25.848: "Physical Layer Aspects of High Speed Downlink Packet Access", version 5.0.0, available at http://www.3gpp.org).

As mentioned before, a retransmission protocol with asynchronous data transmission may enable a Node B to have more scheduling flexibility. The scheduling assignment may for example be based on the scheduling information sent from a UE and the interference situation in the cell. The different scheduling approaches considering retransmissions have to be taken into account, in order to enable further control of the uplink interference by the Node B scheduler (see e.g. 3GPP TSG TAN WG1#35: "Relationship between scheduling and HARQ", Tdoc R1-031224, available at http://www.3gpp.org).

A retransmission protocol with asynchronous uplink but synchronous retransmissions as described in the copending European application by the applicant "HARQ Protocol with Synchronous Retransmissions" (application serial no. 03029411.0, filed on Dec. 19, 2003) is one approach, which may allow the scheduler more control on the noise rise in the cell. The transmission of new data packets on an E-DCH is sent in an asynchronous manner in order to keep the advantage of scheduling flexibility, though retransmissions are sent after a predefined time instant upon having received the NACK. The advantages of a retransmission protocol with synchronous retransmissions may also depend on the scheduling mode used.

In the rate controlled scheduling mode Node B may only be controlling the TFCS and the UE can choose among an appropriate TFC for the uplink transmissions. Node B may not have control on the UEs transmission time. There may also not be restrictions on the retransmission timing for the UE. When employing a retransmission protocol with synchronous retransmissions, a Node B may exactly know when the retransmissions are sent by UE, and may thus reserve uplink resources. The latter may enable the Node B to more precisely control the uplink interference in the cell.

In the time and rate controlled scheduling mode Node B schedules the initial transmission of a data packet as well as the retransmissions related thereto. In case retransmissions are sent in a synchronous manner, the Node B may not need to schedule the retransmissions, which reduces the signaling overhead and the processing time for the scheduler in the Node B significantly. In FIG. 11 a transmission on E-DCH in time and rate controlled scheduling mode is shown. The retransmission is sent $T_{sync}$ after having received the NACK. Thus, the UE does not need to monitor the grant channel for a scheduling assignment (SA) for the retransmission.

Due to the fact that retransmissions are always sent after receiving the NACK in this scenario ($T_{sync}$) there are delay benefits on UE side. In case retransmissions are also scheduled, a Node B may assign transmission resources to other UEs instead of scheduling the pending retransmissions.

As already mentioned before a HARQ retransmission protocol with asynchronous data transmission and synchronous retransmissions after a predefined time instant is assumed for transmission on e.g. an E-DCH.

The idea and the benefits gained from a retransmission protocol with synchronous retransmissions have been described in the previous section. However in some situations synchronous retransmissions may cause problems.

When the interference situation in the cell is critical due to heavy traffic, a lot of transmissions are most likely received in error. Therefore a number of simultaneous E-DCH transmissions will cause a corresponding number of retransmissions as a consequence. This may lead to severe problems, since—when using a HARQ protocol with synchronous retransmissions—the Node B has no control on the retransmission timing. Due to the fact that in the uplink of CDMA systems, simultaneous transmissions interfere with each other, the uplink interference in the cell is increased by the large number of retransmissions at a specific time instance.

Furthermore the UEs may increase the power for retransmissions as a result of the high interference in the cell in order to send the packet successfully. This will cause a further increase of the uplink noise rise. In order to maximize system throughput it is beneficial in CDMA to operate close to the maximum cell load. On the other side this could cause congestion and instability during fast variations of interference.

In another scenario there may be a situation in which other UEs need to transmit high priority data that may not be sent in parallel to the retransmissions due to a high interference level.

SUMMARY OF THE INVENTION

The object of the present invention is to provide a control of the retransmission mode in order to overcome at least one of the before mentioned problems.

The object is solved by the subject matter of the independent claims. Advantageous embodiments of the present invention are subject matters to the dependent claims.

According to an aspect of the present invention the problem of synchronous retransmissions in interference critical situations may be mitigated by means of additional feedback information from Node B sent in the downlink to the UE. This feedback information on the scheduling of retransmission may be combined with the HARQ feedback information.

According to an embodiment of the present invention a method for controlling the retransmission mode in a wireless communication system wherein a retransmission protocol, such as a HARQ protocol, may be used to retransmit data from a transmitting entity to a receiving entity via a data channel. According to this embodiment the receiving entity may receive a data packet from the transmitting entity, and may determine whether the data packet has been successfully received. For example, in interference critical situations within a cell, it is likely that a high number of data packets from different UEs are not successfully received. If these UEs would perform synchronous retransmissions a comparable high interference level in the cell would be the result at the time the retransmissions are transmitted.

If it has been determined that the data packet has not been successfully received the receiving entity may determine whether the interference level is above or equal to a predetermined threshold interference level. For example, the uplink interference level may be measured.

Next, a feedback message may be transmitted to the transmitting entity, wherein the feedback message indicates to the transmitting entity that the retransmission data packet for the received data packet will be scheduled if the determined interference level is above or equal the predetermined threshold interference level. If the determined interference level is below the predetermined threshold interference level the feedback message indicates to the transmitting entity to transmit a retransmission data packet for the received data packet after a predetermined time span upon having received the feedback message.

More specifically, the receiving entity may be scheduling data transmissions of the transmitting entity. A retransmission data packet may be a retransmission of the received data packet or may only comprise information providing a higher level of redundancy to the previously unsuccessfully received data packet, such that decoding may be possible after soft combining one or more retransmission data packets with the received data packet.

According to another embodiment, the receiving entity may schedule data transmissions of a plurality of transmitting entities comprising the transmitting entity, and may stop the scheduling of new data transmissions from the plurality of transmitting entities, if the interference level is above or equal the predetermined threshold interference level. This embodiment may be especially applicable for a time and rate controlled scheduling mode for the transmitting entity.

When the interference level drops below the predetermined interference level, the scheduling by the receiving entity may be continued.

As explained above, using Node B controlled scheduling may be executed by controlling the "Node B controlled TFCS". According to another embodiment of the present invention the receiving entity may use a similar mechanism to reduce uplink interference. The receiving entity may control a transmission format combination subset of the transmitting entity, wherein the transmission format combination determines—among other attributes—the amount of data the transmitting entity is allowed to transmit and may restrict the transmission format combination subset of the transmitting entity, if the determined interference level is above or equal to the predetermined threshold interference level. This embodiment may be especially suited for transmissions in the rate controlled scheduling mode.

According to a further embodiment of the present invention, the receiving entity may transmit a scheduling assignment to the transmitting entity to assign resources for a retransmission of the received data packet to the transmitting entity, if the feedback message indicates that the retransmission will be scheduled. The scheduling assignment may for example be transmitted via a scheduling related control channel. Based on the feedback message the transmitting entity may recognize that the interference level is above the threshold and may perform no data transmissions autonomously or scheduling requests for example for a predetermined time period.

In a further embodiment of the present invention the receiving entity is transmitting to the transmitting entity a feedback message indicating a successful reception of the data packet or indicating to transmit a retransmission data packet to the receiving entity after a predetermined time span upon having received the feedback message.

The transmitting entity may have monitored a scheduling related control channel and may not have received a scheduling assignment for a retransmission. Therefore the transmitting entity may issue a scheduling request to the receiving entity.

Thus, a scheduling request for the received data packet may be received from the transmitting entity in response to the feedback message, and the receiving entity may transmit to the transmitting entity a scheduling assignment for a retransmission of the received data packet in response to the scheduling request. Further, a retransmission of the received data packet may be received at the receiving entity. The retransmission data packet may be discarded upon reception, if the receiving entity transmitted a positive feedback confirming the successful reception of the data packet to the transmitting entity.

Further, the scheduling assignment may be transmitted within a predetermined time interval after having transmitted the feedback message. The time interval may for example be controlled by means of a timer.

According to this embodiment, the present invention is capable of addressing the problem that though the feedback message transmitted by the receiving entity and indicating a successful reception of a data packet, the transmitting entity receives a feedback message indicating an unsuccessful reception, e.g. due to a transmission error, and acts in response to the forged feedback message. Also in case a negative feedback—NACK—is misinterpreted by the transmitting entity as a negative feedback in an interference critical situation—NACK-S—, this embodiment may offer a solution for solving this particular problem.

There may be different ways to transmit the feedback messages. The additional information introduced to the feedback message by taking into account the interference level may be combined with the HARQ feedback (ACK/NACK). For example a different code word for the HARQ feedback could be used, where the new feedback format NACK-S is encompassed (see for example table below).

The combined feedback (ACK/NACK/NACK-S) could also be combined with other signaling information, for example scheduling control signaling. In the latter case the combined feedback and the other signaling information may be encoded together.

Another alternative may be to signal the additional feedback on a different OVSF code i.e. channel, than the HARQ feedback (ACK/NACK)

Thus, feedback messages indicating the successful or the unsuccessful reception of a data packet may be transmitted via one control channel. Further, the information in the feedback messages may be combined with scheduling related control information and may be jointly encoded.

Alternatively, a further embodiment of the present invention proposes the use of different spreading codes, e.g. OVSF codes, for spreading negative feedback messages depending on the interference level in a cell. Thus, the feedback message may be spread using different OVSF codes in response to the feedback mode indicated by the feedback message. The additional feedback message (NACK-S) indicating that the retransmission will be scheduled, may be signaled using a different spreading code, e.g. OVSF code, than the HARQ protocol feedback information (ACK, NACK).

According to another embodiment, the present invention provides a method for controlling the retransmission mode in a wireless communication system wherein a retransmission protocol, such as HARQ, may be used to retransmit data from a transmitting entity to a receiving entity via a data channel.

According to this method the transmitting entity may transmit a data packet to the receiving entity, and may receive a feedback message from the receiving entity, wherein the feedback message indicates whether a retransmission data packet for the transmitted data packet will be scheduled, or whether to transmit a retransmission data packet for the transmitted data packet to the receiving entity after a predetermined time span upon having received the feedback message. According to the indicated option in the feedback message the transmitting entity may halt the retransmission process and monitors the scheduling related control channel for a scheduling assignment message or may transmit a retransmission data packet to the receiving entity after a predetermined time span upon having received the feedback message.

In a further embodiment of the present invention a scheduling related control channel may be monitored by the transmitting entity for a scheduling assignment for the retransmission related to the transmitted data packet, if the feedback message indicates that the retransmission will be scheduled.

In order to reduce the power consumption in a receiving entity, according to another embodiment, the scheduling related control channel may be monitored for a predetermined time interval upon receiving the feedback message. Of course, e.g. if power consumption is no issue, the control channel may also be constantly monitored.

In a further embodiment, the transmitting entity may receive a scheduling assignment related to the retransmission of the transmitted data packet.

Further, e.g. in response to said scheduling assignment, the receiving entity may retransmit the transmitted data packet to the receiving entity at a point in time indicated by the received scheduling assignment.

According to another embodiment, the transmitting entity may transmit a retransmission data packet to the receiving entity after the predetermined time span upon having received the feedback message, if indicated by the received feedback message.

In a further embodiment of the present invention the transmitting entity may transmit a scheduling request to the receiving entity, if no scheduling assignment has been received in the predetermined time interval after receiving a feedback message indicating that the retransmission will be scheduled. In response to the transmission of the scheduling request the transmitting entity may receive via the scheduling related control channel a scheduling assignment from the receiving entity, and may retransmit the retransmission data packet to the receiving entity at a point in time indicated by the scheduling assignment.

In another embodiment of the present invention it is suggested that the transmission entity is monitoring a scheduling related control channel for a scheduling assignment for the transmitted data packet, if the feedback message indicated the successful reception of the data packet. Upon receiving a scheduling assignment for the transmitted data packet, the transmitting entity may retransmit the transmitted data packet to the receiving entity at a point in time indicated by the scheduling assignment.

In a further embodiment, the transmitting entity may stop autonomous transmissions of data or scheduling requests, i.e. the transmission of for which no resources have been explicitly assigned to the transmitting entity by the receiving entity, for a predetermined time interval or for a time span indicated by the receiving entity in response to receiving a feedback message indicating that the retransmission data packet for the transmitted data packet will be scheduled.

Further, the present invention provides a base station in a wireless communication system wherein a HARQ retransmission protocol is used to retransmit data from a mobile terminal to the base station via a data channel. According to the embodiment, the base station may comprise receiving means for receiving a data packet from the mobile terminal, and processing means for determining whether the received data packet has been successfully received, wherein the processing means may be adapted to determine whether the interference level is above or equal to a predetermined threshold interference level, if processing means has determined that the data packet has not been successfully received. According to a further embodiment, also the number of expected retransmissions may be taken as a measure for deciding whether to schedule retransmissions or whether to continue with their synchronous transmission.

The base station may further comprise transmission means for transmitting a feedback message to the mobile terminal, if processing means has determined that the data packet has not been successfully received, wherein the feedback message indicates to the mobile terminal that the retransmission will be scheduled, if the determined interference level is above or equal the predetermined threshold, and wherein the feedback message indicates to the mobile terminal to transmit a retransmission data packet to the base station after a predetermined time span upon having received the feedback message, if the determined interference level is below the predetermined threshold interference level.

In another embodiment of the present invention a base station is provided which is adapted to perform the method of controlling the retransmission mode as described in the various embodiments above which relate to the receiving entity.

Another embodiment of the present invention provides a mobile terminal in a wireless communication system wherein a HARQ retransmission protocol is used to retransmit data from a mobile terminal to the base station via a data channel. The mobile terminal may comprise transmission means for transmitting a data packet to the receiving entity, receiving means for receiving a feedback message from the receiving entity, and processing means for determining whether the feedback message indicates that the retransmission will be scheduled, or to transmit a retransmission data packet to the receiving entity after a predetermined time span upon having received the feedback message.

The transmission means may be adapted to transmit a retransmission data packet for the transmitted data packet to the receiving entity after a predetermined time span upon having received the feedback message.

According to this embodiment, the transmission means may be operated in response to the feedback message.

Another embodiment of the present invention provides a mobile terminal according being adapted to participate in the method according to one of the different methods for controlling the retransmission mode described above and which relate to the transmitting entity.

In a further embodiment, the present invention provides a wireless communication system wherein a HARQ retransmission protocol is used to retransmit data from a mobile terminal to the base station via a data channel. According to this embodiment the system comprising at least one base station and at least one mobile terminal described above.

BRIEF DESCRIPTION OF THE FIGURES

In the following the present invention is described in more detail in reference to the attached figures and drawings. Similar or corresponding details in the figures are marked with the same reference numerals.

DETAILED DESCRIPTION OF THE INVENTION

Figure 1:
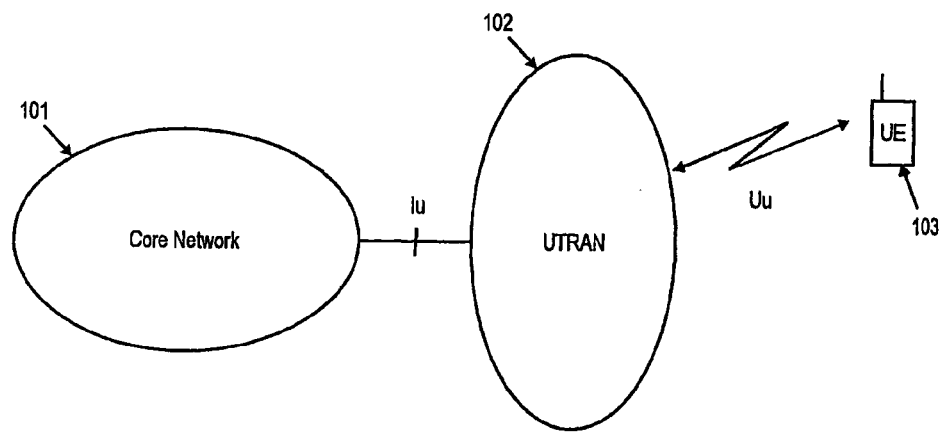
FIG. 1 shows the high-level architecture of UMTS.
Figure 2:
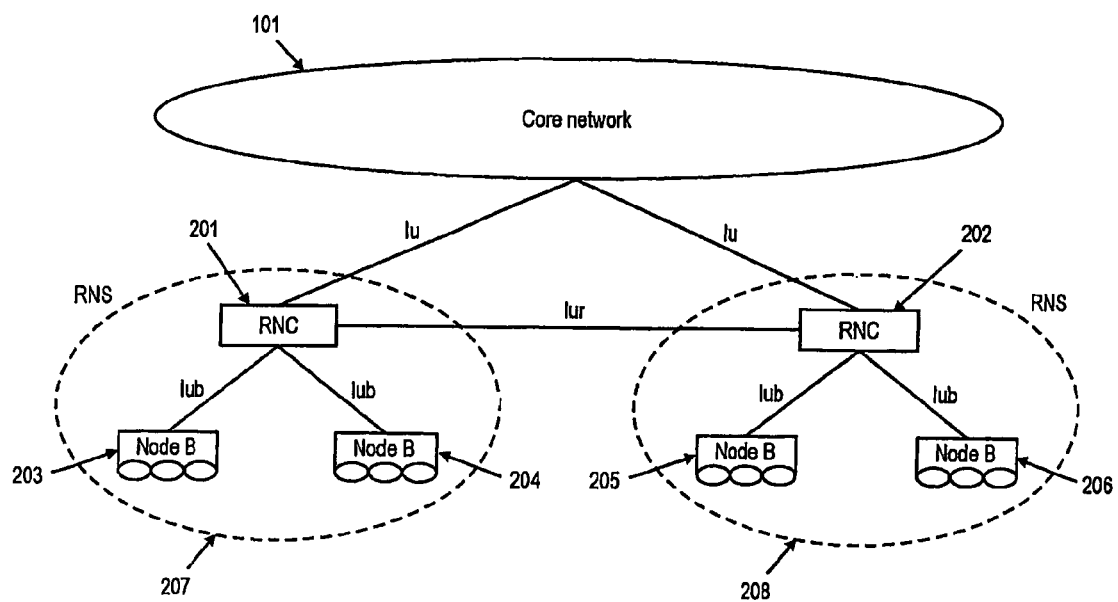
FIG. 2 shows the architecture of the UTRAN according to UMTS R99/4/5.
Figure 3:
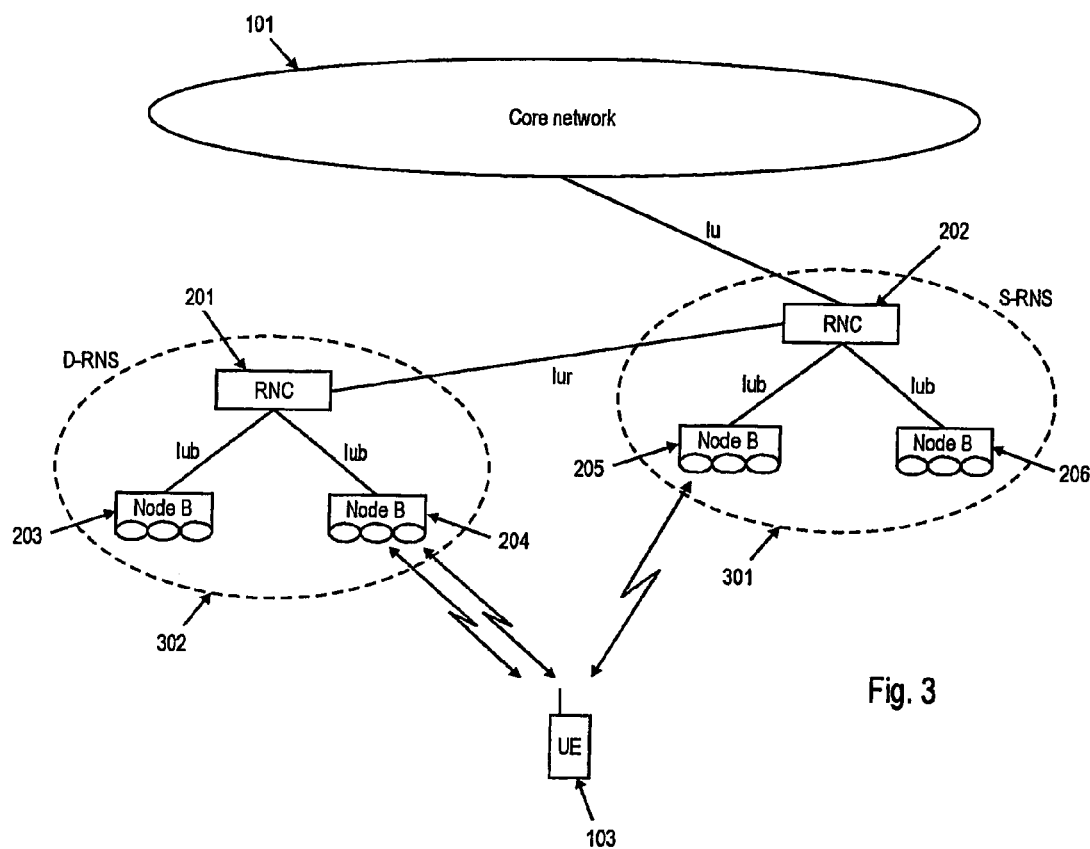
FIG. 3 shows a Drift and a Serving Radio Subsystem.
Figure 4:
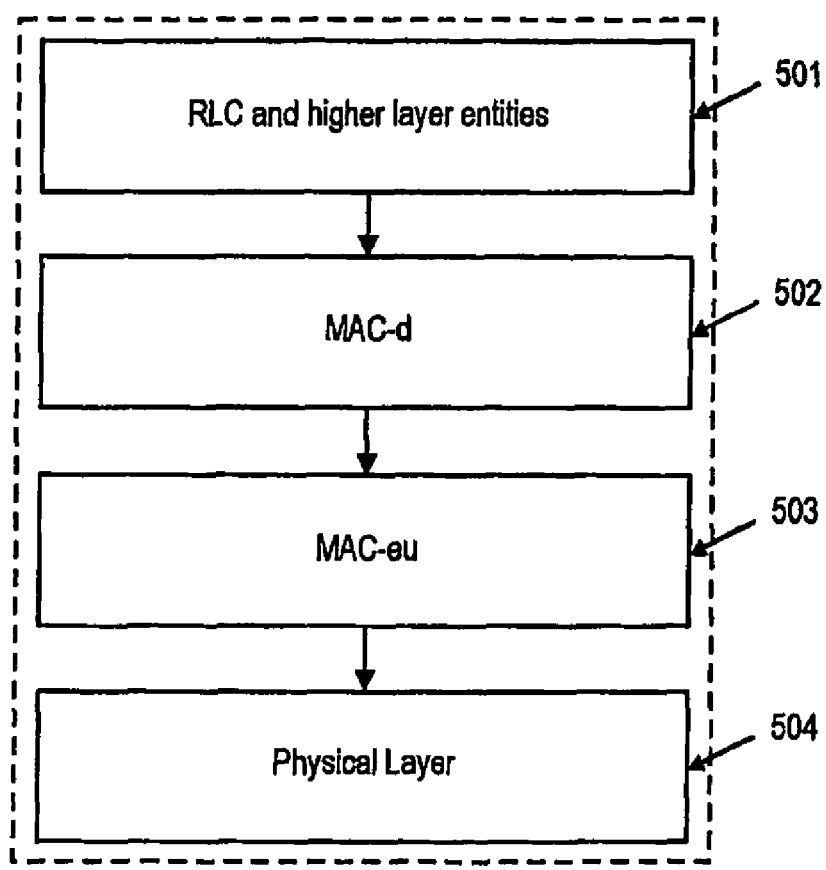
FIG. 4 shows the E-DCH MAC architecture at a user equipment.
Figure 5:
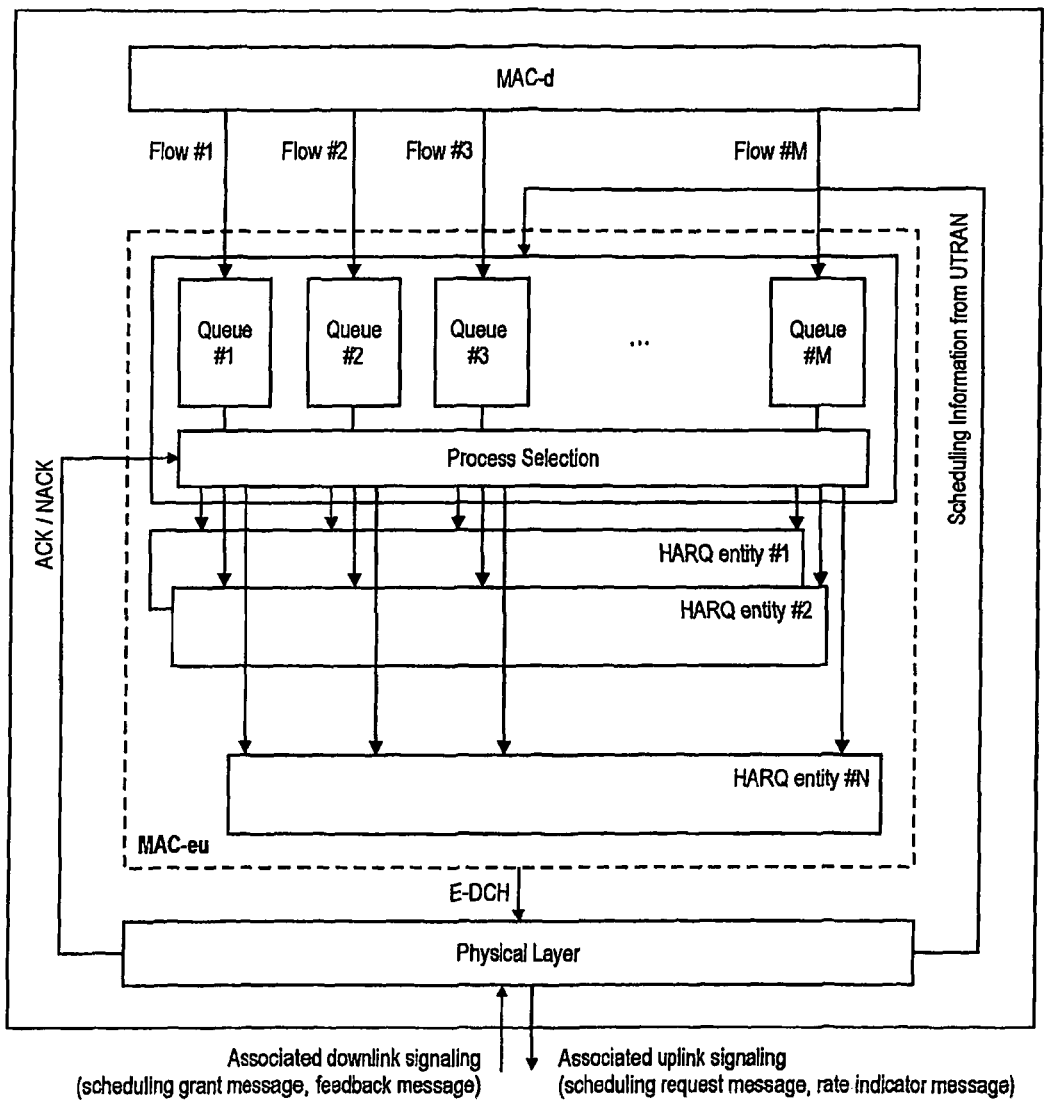
FIG. 5 shows the MAC-eu architecture at a user equipment.
Figure 6:
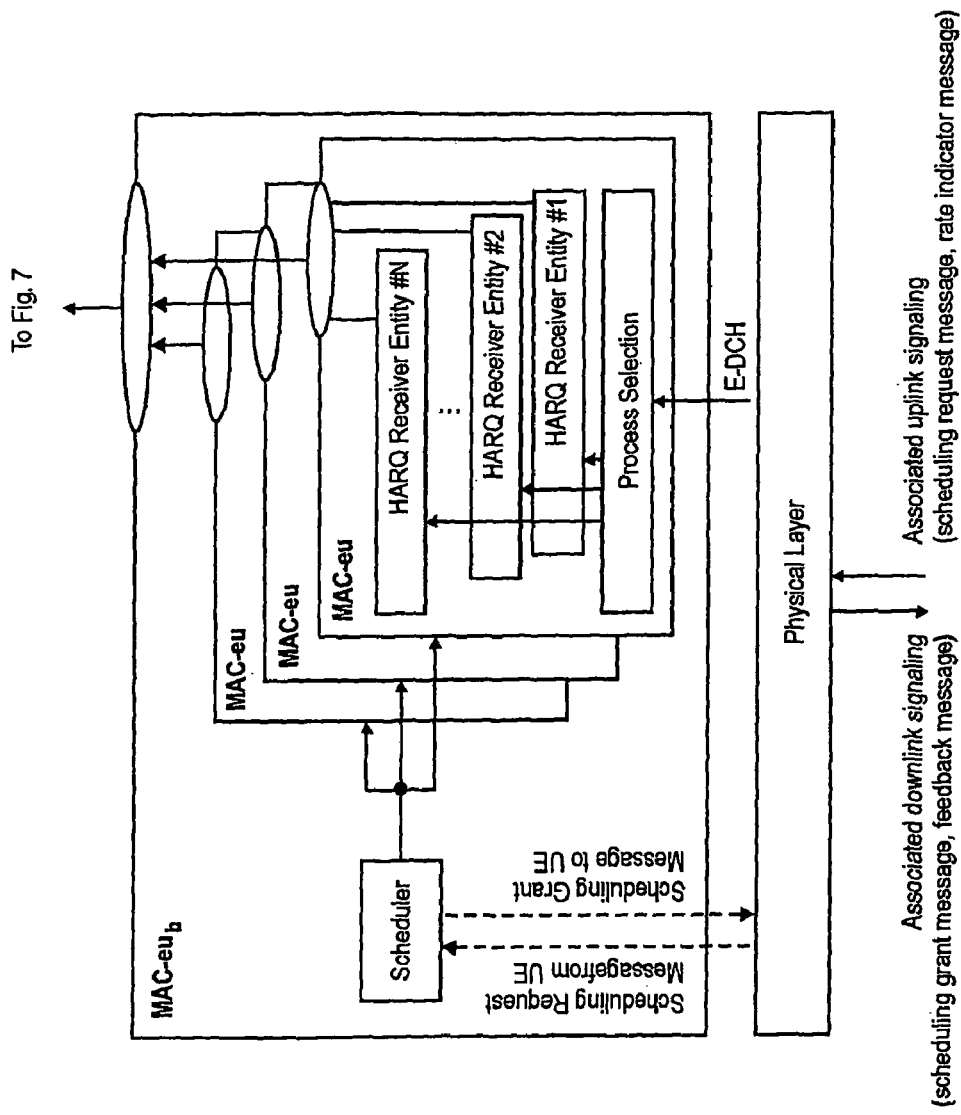
FIG. 6 shows the MAC-eu architecture at a Node B.
Figure 7:
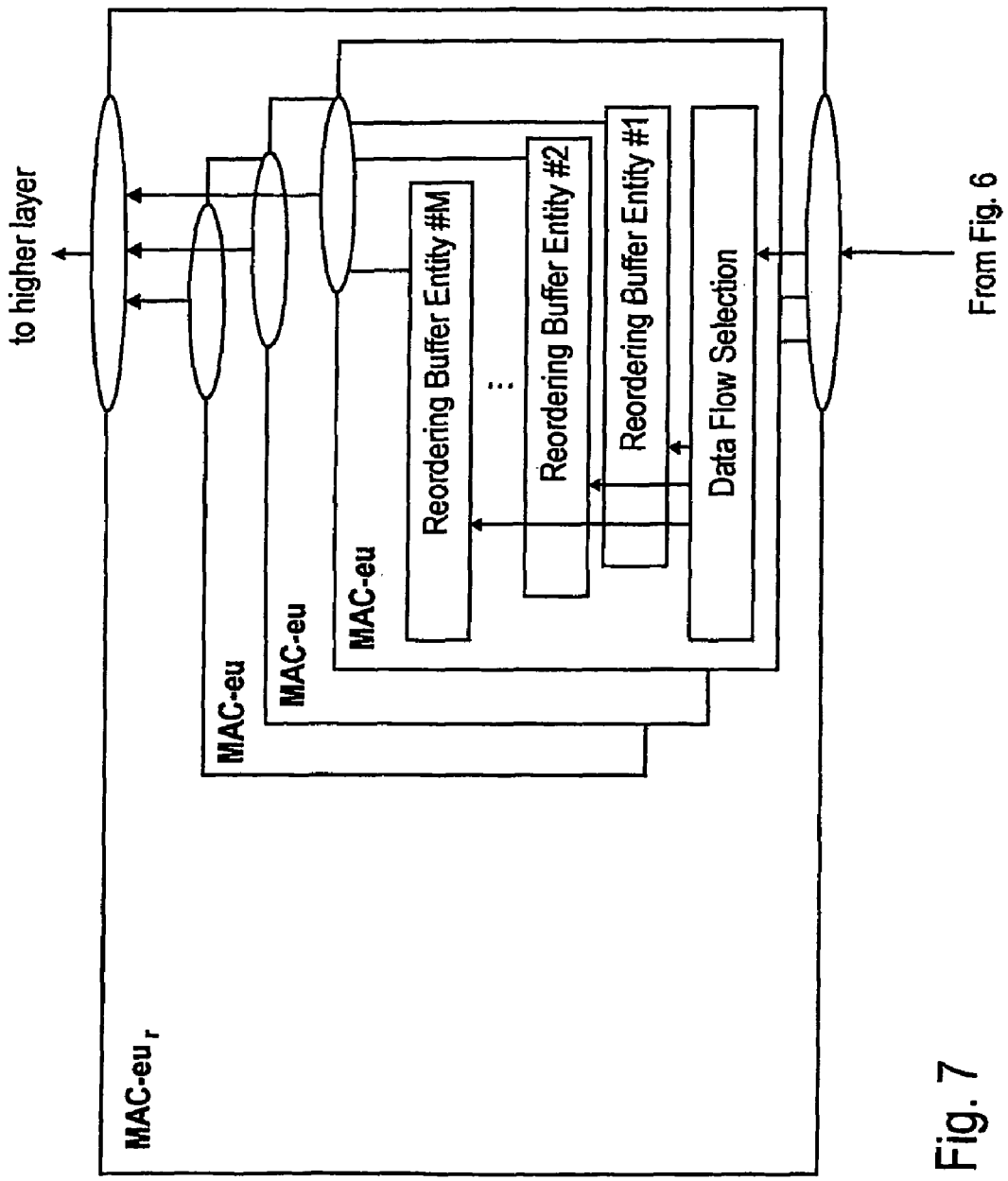
FIG. 7 shows the MAC-eu architecture at a RNC.
Figure 8:
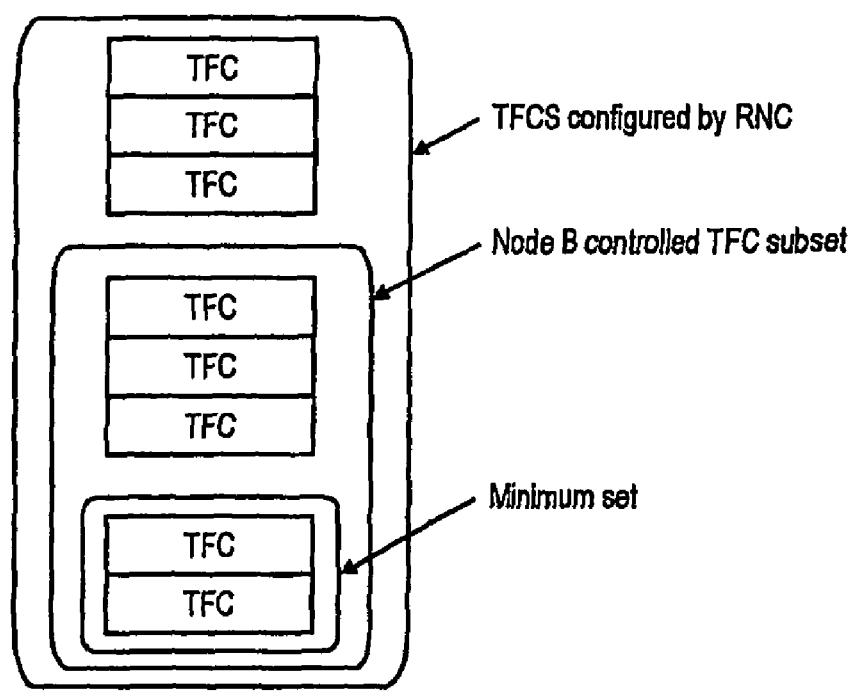
FIG. 8 shows transport format combination sets for Node B controlled scheduling.
Figure 9:
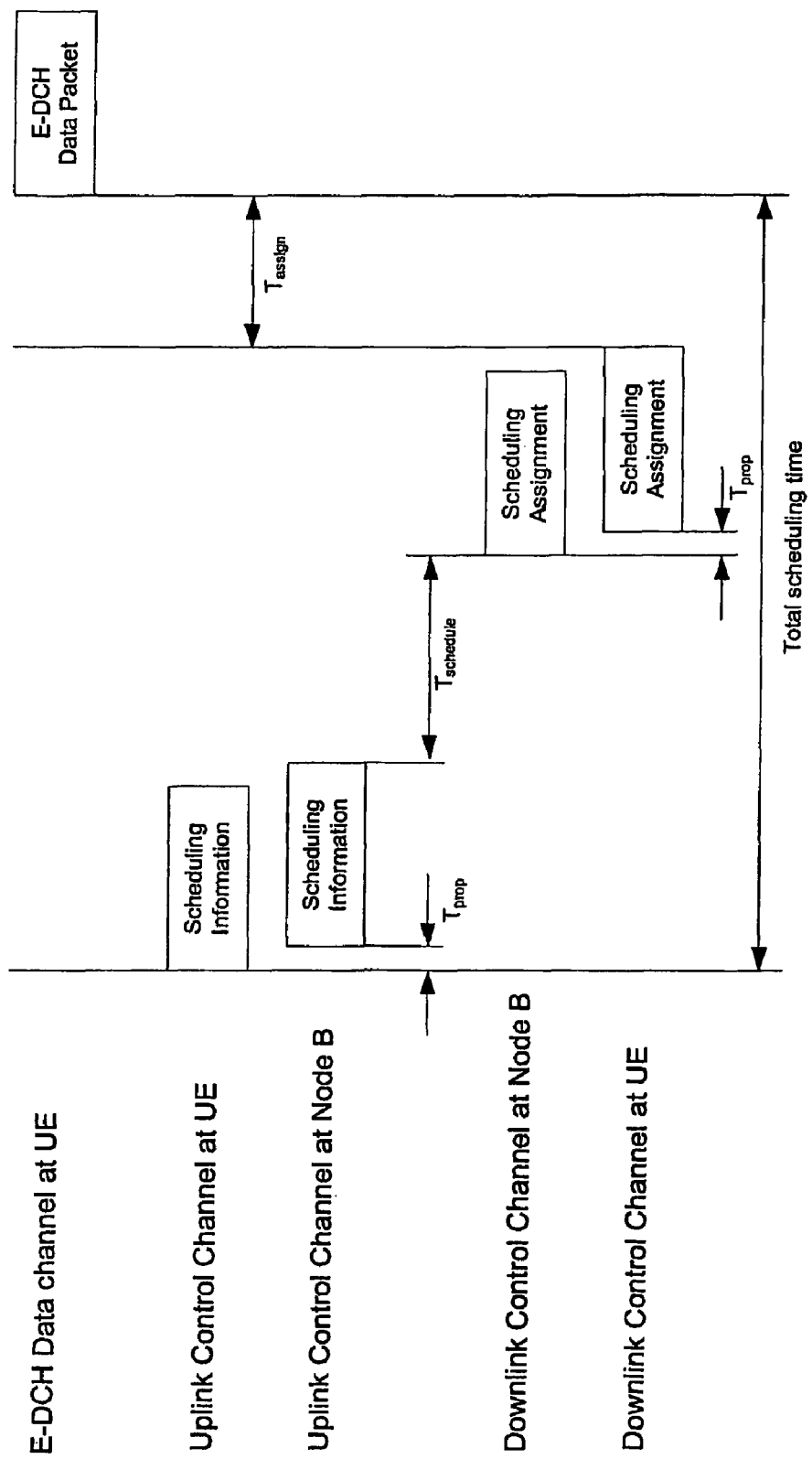
FIG. 9 shows the operation of a time and rate controlled scheduling mode.
Figure 10:
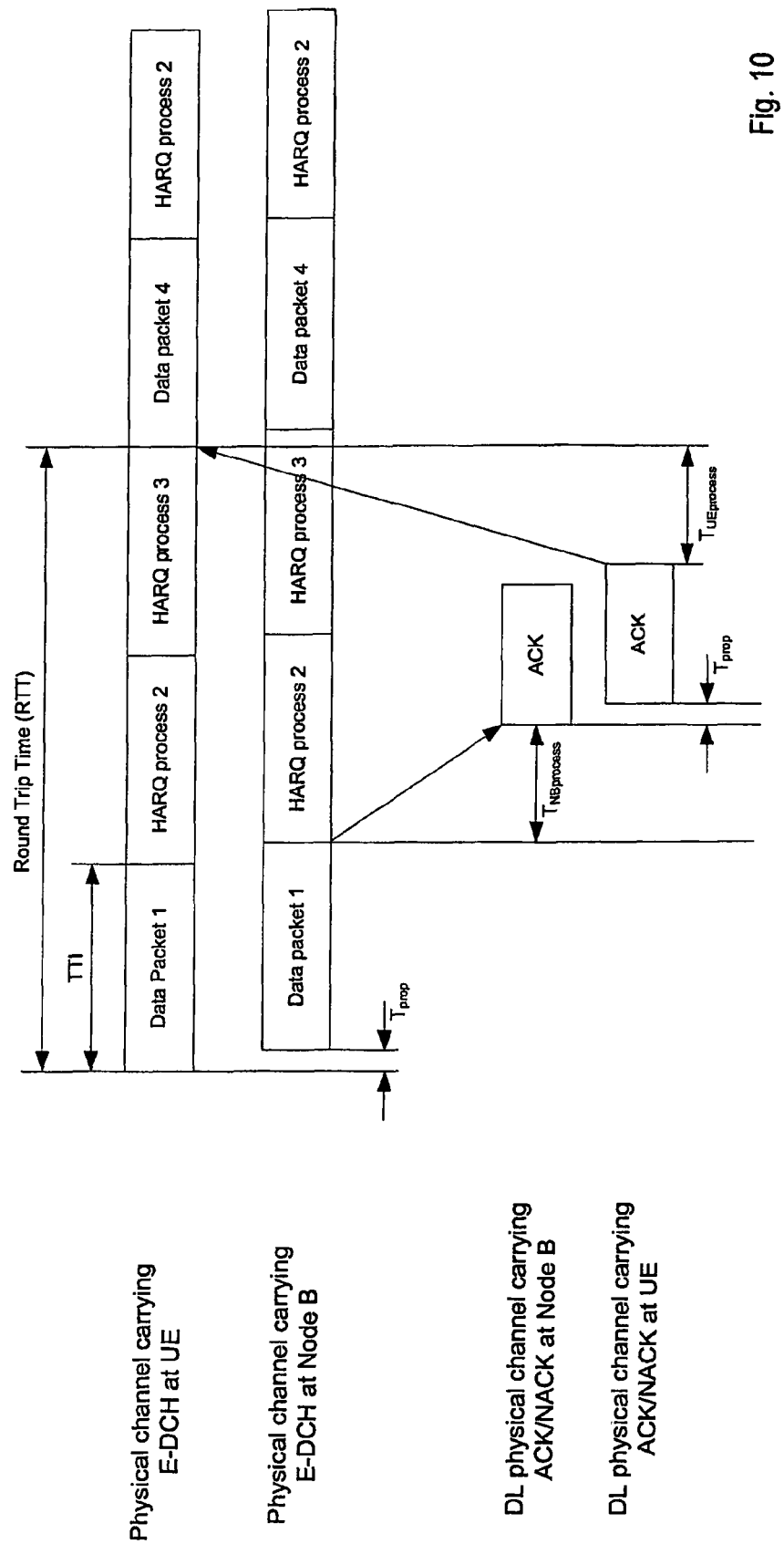
FIG. 10 shows a the operation of a 3-channel stop-and-wait HARQ protocol.
Figure 11:
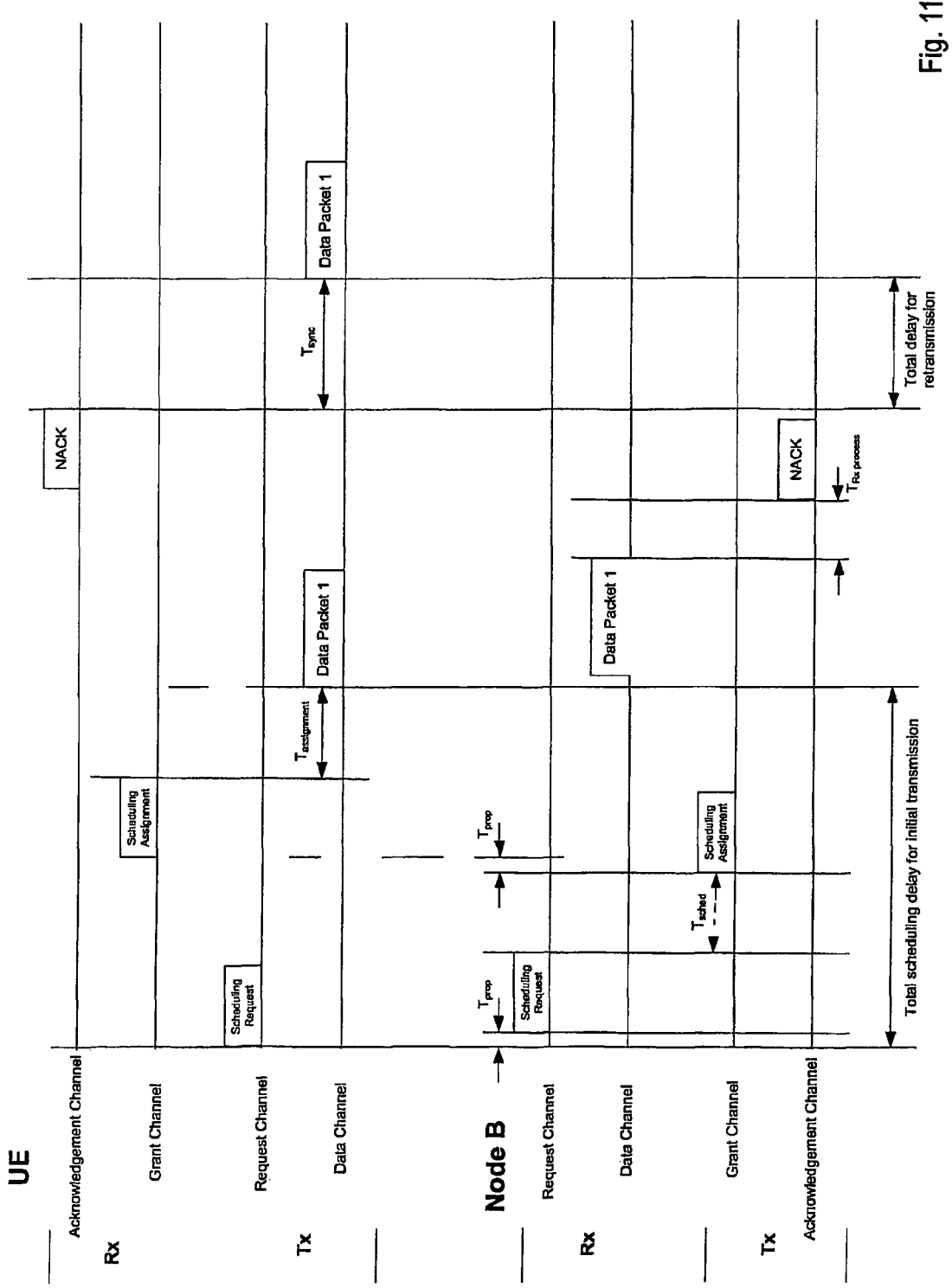
FIG. 11 shows the transmission timing for an HARQ protocol using synchronous retransmissions.

As explained above, according to an aspect of the present invention the problem of synchronous retransmissions in interference critical situations may be mitigated by means of additional feedback information sent from Node B in the downlink to the UE.

Additional feedback Information may for example be transmitted in form of a negative acknowledgment indicating a (re)scheduling of the incorrectly received data packet—NACK-S(chedule). The new feedback information NACK-S may be signaled in the downlink from a Node B to the respective UE when a data packet is received incorrectly at Node B and the uplink interference situation in the cell is critical, e.g due to heavy traffic. The NACK-S may indicate to the UE not to send the retransmission of the data packet after the defined time $T_{sync}$ upon having received the negative feedback (synchronous retransmission), but to monitor the scheduling related downlink control channel (scheduling grant channel) for a scheduling assignment.

Hence, instead of sending retransmissions synchronously after a predetermined time interval in response to a negative feedback from the Node B, the UE may be instructed to await a scheduling assignment for the unsuccessfully received data packet on a scheduling related control channel indicating to the UE when to perform a retransmission. The UE may not need to transmit a scheduling request for the retransmission, which reduces the signaling overhead in the uplink and decrease the scheduling delay.

According to one embodiment of the present invention the Node B may be operated in the following way. If a packet has been received incorrectly and the uplink interference situation in the cell is critical then NACK-S may be signaled in the downlink. The uplink interference level in the cell may therefore be measured e.g. in response to incorrectly receiving a data packet at the Node B or may be continuously monitored by the Node B. The feedback message NACK-S providing the feedback information to the UE may indicate to the UE not to send the retransmission of the data packet after $T_{sync}$ upon having received the NACK, but to wait for a scheduling assignment message. The Node B may schedule the retransmission most likely at a later point of time when noise rise situation in cell allows for new data traffic.

Further to sending a NACK-S to the UE, the Node B may stop scheduling UEs for new data transmission on E-DCH when scheduling is performed in a time and rate controlled mode and may restrict the "Node B allowed TFC Subset" for the rate controlled scheduling mode in addition, in order to limit the uplink interference caused by autonomous UE transmissions. Scheduling of new UEs' data transmission may for example be continued once the uplink interference level drops below a predetermined threshold interference level.

Next, the UE's operation according to one embodiment of the present invention will be discussed. Once a NACK-S is received by a UE, the UE may halt the retransmission for the respective data packet. It may further monitor the scheduling related downlink control channel for a scheduling assignment of the retransmission.

The UE knows from the feedback information (NACK-S), that the current uplink interference situation in the cell is critical. Therefore the UE may be forbidden to transmit data on E-DCH autonomously when scheduling is performed in a rate controlled mode or to sent scheduling requests for new data transmissions.

Figure 12:
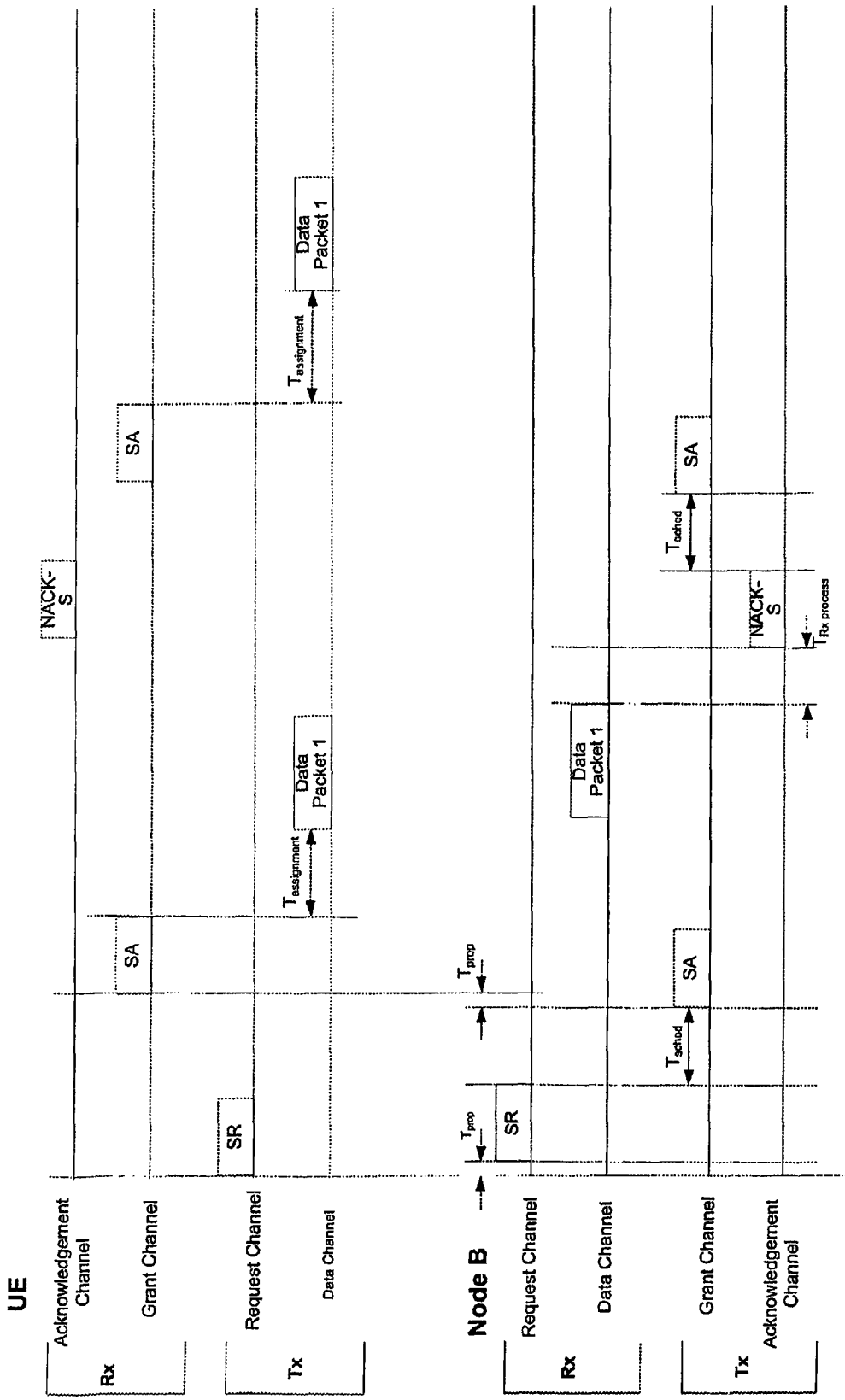
FIG. 12 shows signaling of a NACK-S feedback message and the resulting transmissions according an embodiment of the present invention.

In FIG. 12 an example for the signaling of NACK-S and the corresponding UE behavior and Node B behavior is shown. After the decoding of Data packet 1 has failed, the Node B signals a NACK-S to the UE. The Scheduling Assignment message for the retransmission is signaled on the Grant Channel which is one example for a scheduling related control channel. The variable $T_{sched}$ denotes the processing time of the scheduler.

The signaling of NACK-S indicates to the UE to switch from the synchronous to the asynchronous mode for the retransmission of that packet. i.e. instead of transmitting retransmission data autonomously upon elapse of a predefined time span upon having received feedback, which indicates that data packet was received incorrectly, (synchronous retransmission), the UE now has to await a scheduling assignment from the Node B granting resources on the air interface for the retransmission data packet (asynchronous retransmission). The Node B may schedule the retransmission of the UEs and may therefore take into account the uplink interference situation when deciding when and which UE is to be granted resources on the air interface using a scheduling assignment.

The introduction of the additional feedback information in the downlink may provide the Node B with more control on the air interface resources allowing it better react on and to overcome interference critical situations. However this control is obtained at the costs of additional signaling in the downlink, as e.g. the scheduling assignment is additionally transmitted to a NACK-S. Furthermore, the UE needs to monitor the scheduling grant channel for the scheduling assignment, which may increase its power consumption.

In the current standardization procedure of UMTS, only a two-level feedback is foreseen for E-DCH in the downlink: ACKnowledgments and Negative ACKnowledgments (NACK). One possibility to encode a 1 bit acknowledgement indication is repetition coding, for example 10 copies of the indication bit. Introducing a third level for NACK-S may decrease the reliability of the feedback information.

Different mechanism may be used to extent the 1 bit ACK/NACK signal. One other possible solution could be to use a different spreading code, e.g. an Orthogonal Variable Spreading Factor (OVSF) code, for the ACK/NACK signal. The usage of the codes may be signaled or may be pre-defined. The UE may monitor and dispread all possible OVSF codes to obtain HARQ feedback information.

Another realization of this scheme may use a different code word for the ACK/NACK signal instead of using simple repetition. An example of using the code word of the ACK/NACK signaling with the additional NACK-S signal is shown in the table below.

| ACK    | 1 | 1 | 1 | 1 | 1 | 1 | 1 | 1 | 1 | 1 |
| NACK-S | 1 | 0 | 1 | 0 | 1 | 0 | 1 | 0 | 1 | 0 |
| NACK   | 0 | 0 | 0 | 0 | 0 | 0 | 0 | 0 | 0 | 0 |

It may also be possible to send the ACK/NACK-S/NACK feedback simultaneously with further control signaling in the downlink, e.g. scheduling related control signaling. In this case the control information could be encoded together. Error correction codes, like turbo codes or convolutional codes, may be applied for the encoding of the control information.

Next, timing aspects for the transmission of the scheduling assignment message will be outlined in more detail. As shown in FIG. 12, Node B transmits a scheduling assignment (SA) message in addition to the NACK-S in the downlink. Upon having received a NACK-S, the UE monitors the scheduling related control channel for the SA message. In order to optimize the UE power consumption required for the monitoring of the control channel, a specific timing for the SA message may be defined.

Figure 13:
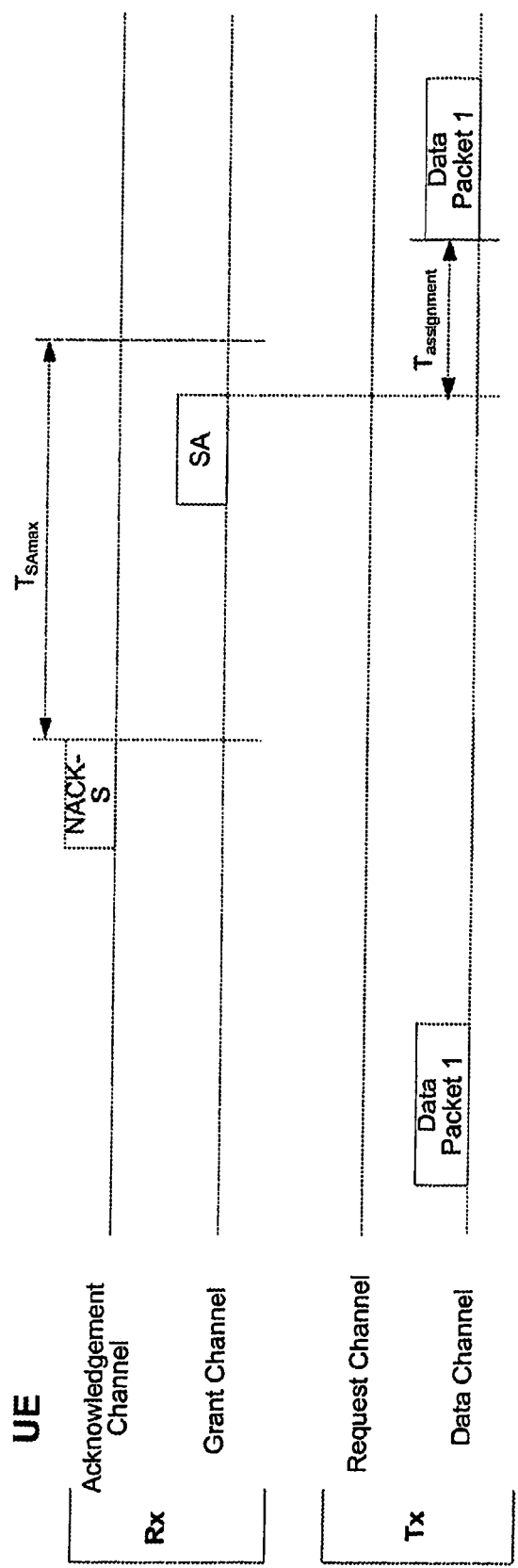
FIG. 13 shows the timing for the transmission of a scheduling assignment message according to an embodiment of the present invention.

FIG. 13 shows the timing for transmitting a scheduling assignment message. In the embodiment of the present invention shown in FIG. 13, $T_{SAmax}$ denotes the maximum period of time a UE monitors the control channel for a SA message after having received the NACK-S. A timer on UE side may be started as soon as a NACK-S is received wherein the timer is set equal to $T_{SAmax}$. The UE may monitor the control channel until the timer expires. Corresponding to the timer in the UE, a timer in Node B may be started as soon as the NACK-S is signaled on the downlink, i.e. upon the transmission of the NACK-S to the UE. The Node B may be allowed to send a SA message to the UE as long as the timer is not expired.

According to a further embodiment of the present invention it may also be possible that the UE constantly monitors the scheduling related control channel. For example if sufficient power resources are available to the UE, this operation may be possible.

A further aspect of the present invention is the operation of the proposed HARQ protocol in case a misinterpretation of the feedback information occurs at the UE.

In case the additional feedback information (NACK-S) is combined with the HARQ feedback signal (ACK/NACK), the UE may misinterpret the signaled feedback (ACK/NACK/NACK-S) due to channel distortions. In the following the Node B respectively UE behavior in case of some specific feedback misinterpretations is given.

In a first scenario, the Node B decodes the received data packet correctly and sends an ACK to the UE. However due to channel distortions the UE receives an NACK-S. As outlined in an embodiment of the invention above, in case the UE receives a NACK-S, it may expect a scheduling assignment message on the scheduling related control channel. In the figure $T_{SAmax}$ denotes the maximum period of time the UE monitors the control channel after having received the NACK-S.

In case no scheduling assignment message has been received with in $T_{SAmax}$, the UE has either missed the scheduling assignment due to bad channel conditions or the Node B has either send an ACK or NACK and the feedback was misinterpreted by UE. Therefore the UE may send once again a scheduling request for the data packet and Node B may schedule the transmission upon having received the scheduling request. The already correctly received data packet is again transmitted in the uplink in case UE misinterprets an ACK to an NACK-S and may be discarded by the receiving Node B upon reception.

Next a scenario is investigated in which the UE interprets a NACK-S as an ACK. In this embodiment, the Node B signals NACK-S to the UE after the decoding of a received data packet was not successful. For example due to distortions on the air interface the UE receives an ACK instead of the signaled NACK-S. Usually the UE may transmit a scheduling request for a new packet transmission upon having received an ACK. Therefore the previously data packet received in error would have to be retransmitted by higher layer retransmissions which would cause a significant delay.

To solve this problem, the Node B may transmit a scheduling assignment message for the retransmission in case a NACK-S is signaled to the UE. If UE monitors the scheduling related control channel for $T_{SAmax}$ even if an ACK was received, the UE could detect the misinterpretation by receiving a scheduling assignment message on the control channel. Hence, the UE may transmit the retransmission upon having received the scheduling assignment. No higher layer retransmission would be necessary, which would avoid the delay caused by higher layer retransmissions. In this scenario however, the UE also monitors the control channel for a scheduling assignment message after having received an ACK in order to detect the misinterpretation, which may increase the UE power consumption.

In a further scenario, the misinterpretation of a NACK as a NACK-S by the UE is investigated. In case Node B signals a NACK in the downlink and the UE receives a NACK-S, the UE behavior may be the same as in the case of an ACK-NACK-S misinterpretation. The UE may send once again a scheduling request for the retransmission after having not received any scheduling assignment message within $T_{SAmax}$. Since Node B has signaled a NACK to the UE, the retransmission should be sent $T_{sync}$ after having received the NACK. The Node B may have reserved resources for the retransmission and may have taken it into account for further scheduling decisions. Due to the feedback misinterpretation the reserved resources may be wasted.

Figure 14:
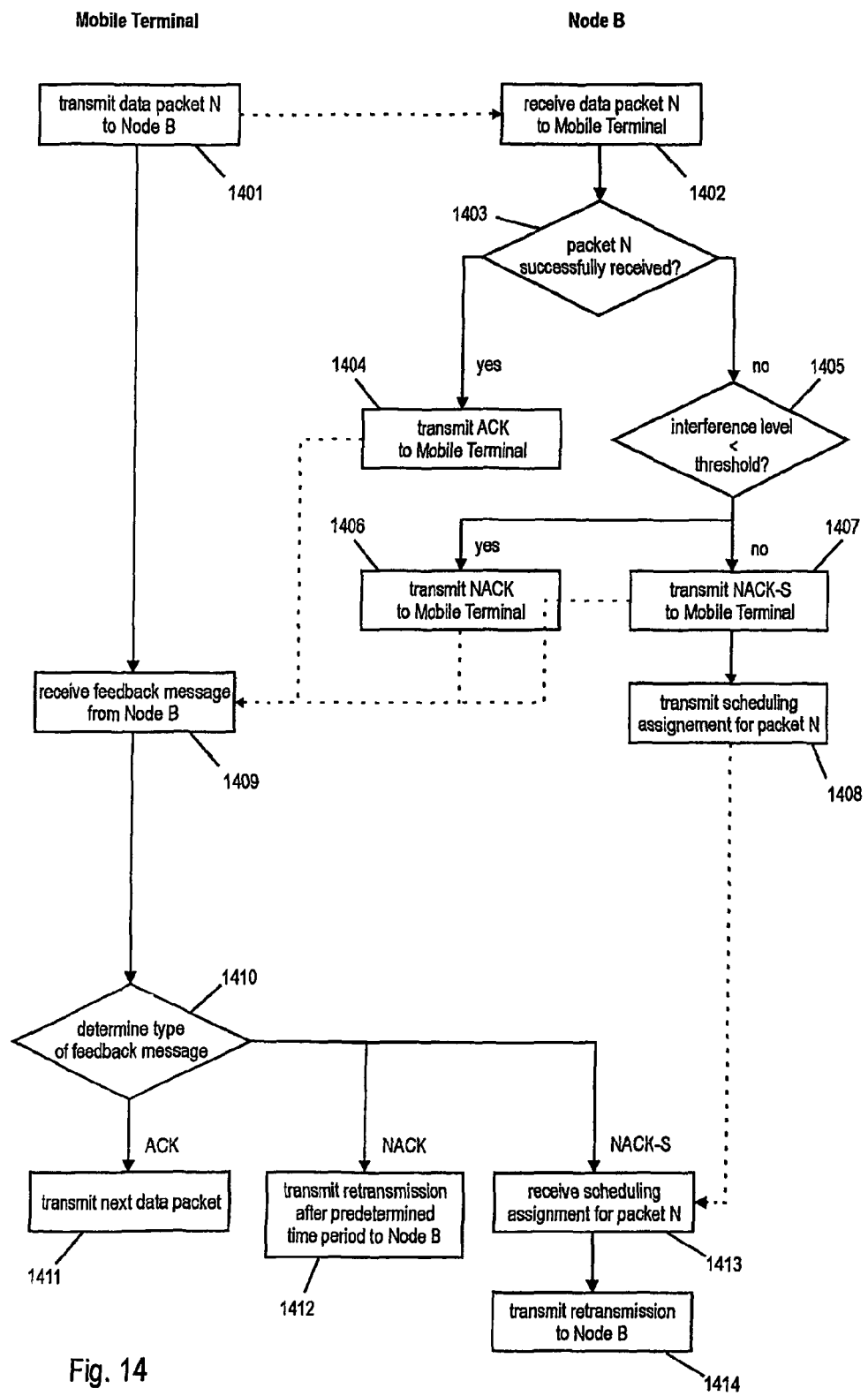
FIG. 14 shows a flow chart for controlling the timing of retransmissions according to an embodiment of the present invention

FIG. 14 shows a flow chart for controlling the retransmission mode according to an embodiment of the present invention. In step 1401 a mobile terminal transmits a data packet to a Node B. The Node B receives the data packet in step 1402 and determines in step 1403, whether the data packet has been successfully received.

If the data packet has been received without an error, the Node B may generate and transmit an acknowledgment ACK in step 1404 to inform the mobile terminal on the successful reception.

If an error has occurred in the transmission of the data packet, the Node B determines in step 1405 whether the current interference level in its cell is above or equal to a predetermined threshold interference level, i.e. whether an interference critical situation within the cell is present. If the interference level is below the threshold, the Node B may transmit a NACK to the mobile terminal in step 1406 to indicate the unsuccessful reception of the packet and to request a synchronous retransmission of the data packet.

If Node B determines in step 1405 that the interference level in the cell is above or equal to the threshold, a NACK-S is generated and transmitted to the mobile terminal in step 1407. As outlined before, the NACK-S indicates an unsuccessful reception of a data packet to the mobile terminal and instructs same to await a scheduling assignment granting resources for a retransmission instead of providing synchronous retransmissions.

The flow advances to block 1408 at which the Node B transmits a scheduling assignment to the mobile terminal in order to grant same resources for a retransmission related to the unsuccessfully received data packet and point to the blocks in which same are processed and/or interpreted.

It is further possible, that the transmission scheduling assignment that is following the feedback message in a high interference situation is performed within a certain time interval after transmitting the feedback message. This time interval may for example be controlled by a timer in the Node B. A respective timer may be provided in the UE to allow same to determine the time interval in which it may monitor the related control channel or in which it is expecting the reception of the scheduling assignment. In case the assignment is not received within this time interval, the UE may transmit a scheduling request for a retransmission. This may be especially applicable to introduce a protocol robustness against forged feedback messages as outlined above.

On the terminal side, the feedback message for the transmitted data packet is received in step 1409. Next, the mobile terminal may determine in step 1410 which type of feedback was sent by the Node B. In case the data packet has been successfully received at the Node B an ACK is received and the mobile terminal may continue to transmit the next data packet to the Node B in step 1411.

In case the data packet was not successfully received and the interference level in the Node B's cell has been acceptable, the Node B issued a NACK. In case the mobile terminal determined that a NACK has been received, it continues by sending a retransmission data packet after expiry of a predetermined time period upon having received the feedback message (NACK), i.e. provided synchronous retransmissions in step 1412.

If the data packet was not successfully received and the interference level in the Node B's cell has not been acceptable, the Node B issued a NACK-S. In this case the mobile terminal may monitor a scheduling related control channel and may receive a scheduling assignment for the retransmission of the data packet via this channel in step 1413. Upon having extracted the information from the scheduling assignment, the mobile terminal may issue the retransmission to the Node B in step 1414

It should be further noted that the dotted arrows in the figure are intended to indicate the transmission of data packets or feedback messages between the mobile terminal and the Node B and point to the blocks in which same are processed and/or interpreted.

The present invention may be especially applicable when a HARQ retransmissions protocol with asynchronous data transmission and synchronous retransmissions is assumed. Further, the present invention is especially applicable to HARQ Type II and Type III, i.e. HARQ protocols using soft combining of data packets and retransmissions.

It should be further noted that the present invention may employed independent of the underlying access network structure, e.g. the Evolved UTRAN architecture or the Release 99/4/5 UTRAN architecture.

Moreover, it should be noted that the present invention is especially applicable to being employed in data transmission in time and rate scheduling mode on an E-DCH according to an embodiment of the present invention.

The invention claimed is:

1. A method for controlling the retransmission mode in a wireless communication system wherein a HARQ protocol is used to retransmit data from a transmitting entity to a receiving entity via a data channel, wherein the receiving entity:
   receiving a data packet from the transmitting entity,
   determining whether the data packet has been successfully received,
   if it has been determined that the data packet has not been successfully received
   determining whether the interference level is above or equal to a predetermined threshold interference level,
   transmitting a feedback message to the transmitting entity,
   wherein the feedback message indicates to the transmitting entity that the retransmission data packet for said received data packet will be scheduled, if the determined interference level is above or equal the predetermined threshold interference level, and
   wherein the feedback message indicates to the transmitting entity to transmit a retransmission data packet for said received data packet after a predetermined time span upon having received said feedback message, if the determined interference level is below the predetermined threshold interference level.

2. The method according to claim 1, further comprising:
   scheduling data transmissions of a plurality of transmitting entities comprising said transmitting entity,
   stopping the scheduling of new data transmissions from said plurality of transmitting entities, if the interference level is above or equal the predetermined threshold interference level.

3. The method according to claim 2, wherein scheduling is continued when the interference level drops below the predetermined interference level.

4. The method according to claim 1, further comprising:
   controlling a transmission format combination subset of the transmitting entity, wherein a transmission format combination determines the amount of data the transmitting entity is allowed to transmit in a transmission time interval, restricting the transmission format combination subset of
   the transmitting entity, if the determined interference level is above or equal to the predetermined threshold interference level.

5. The method according to claim 1, further comprising:
   if the feedback message indicates that retransmission will be scheduled, transmitting a scheduling assignment to the transmitting entity to assign resources for the transmission of the retransmission data packet to said transmitting entity.

6. The method according to claim 5, wherein the scheduling assignment is transmitted via a scheduling related control channel.

7. The method according to claim 6, wherein the scheduling assignment is transmitted within a predetermined time interval after having transmitted the feedback message.

8. The method according to claim 1, further comprising:
   transmitting to the transmitting entity a feedback message indicating the successful reception of said received data packet or indicating to transmit a retransmission data packet to the receiving entity after a predetermined time span upon having received said feedback message,
   receiving in response to said feedback message a scheduling request for said received data packet from the transmitting entity,
   transmitting to the transmitting entity a scheduling assignment for a retransmission data packet for the received data packet in response to said scheduling request,
   receiving the retransmission data packet.

9. The method according to claim 1, wherein feedback messages indicating the successful or the unsuccessful reception of a data packet are transmitted via one control channel.

10. The method according to claims 9, wherein the information in said feedback messages are combined with scheduling related control information and are jointly encoded.

11. The method according to claim 1, wherein the feedback message indicating that the retransmission data packet will be scheduled is signaled using a different OVSF code than the OVSF code used for signaling the feedback messages indicating either a successful reception of the received data packet or to transmit a retransmission data packet after the predetermined time span.

12. A method for controlling the retransmission mode of data retransmissions in a wireless communication system wherein a HARQ protocol is used to retransmit data from a transmitting entity to a receiving entity via a data channel, wherein the transmitting entity:
    transmitting a data packet to the receiving entity,
    receiving a feedback message from the receiving entity, wherein the feedback message indicates whether a retransmission data packet for the transmitted data packet will be scheduled, or whether to transmit the retransmission data packet is transmitted to the receiving entity after a predetermined time span upon having received said feedback message, and
    transmitting a retransmission data packet to said receiving entity after a predetermined time span upon having received said feedback message or at a scheduled point in time in response to said feedback message.

13. The method according to claim 12, further comprising:
    monitoring a scheduling related control channel for a scheduling assignment for the retransmission related to the transmitted data packet if the feedback message indicates that the retransmission will be scheduled.

14. The method according to claim 13 wherein the scheduling related control channel is monitored for a predetermined time interval upon receiving said feedback message.

15. The method according to claim 13, further comprising receiving a scheduling assignment related to the retransmission of said transmitted data packet.

16. The method according to claim 15, further comprising:
    retransmitting the transmitted data packet to the receiving entity at a point in time indicated by the received scheduling assignment.

17. The method according to claim 12, further comprising:
    transmitting a retransmission data packet to the receiving entity after the predetermined time span upon having received said feedback message, if indicated by the received feedback message.

18. The method according to claim 14, further comprising transmitting a scheduling request to the receiving entity, if no scheduling assignment has been received in said predetermined time interval.

19. The method according to claim 18, further comprising:
  receiving via the scheduling related control channel a scheduling assignment from the receiving entity in response to the transmission of the scheduling request, and
  retransmitting the transmitted data packet to the receiving entity at a point in time indicated by the scheduling assignment.

20. The method according to claim 12, further comprising monitoring a retransmission related control channel for a scheduling assignment for said transmitted data packet, if the feedback message indicated the successful reception of said data packet.

21. The method according to claim 20, further comprising:
  receiving a scheduling assignment for the transmitted data packet, and
  retransmitting the transmitted data packet to the receiving entity at a point in time indicated by the scheduling assignment.

22. The method according to claim 12, wherein the method further comprises:
  stopping autonomous transmissions of data and scheduling requests for a predetermined time interval in response to receiving a feedback message indicating that the retransmission data packet for the transmitted data packet will be scheduled.

23. A base station in a wireless communication system wherein a HARQ protocol is used to retransmit data from a mobile terminal to the base station via a data channel, the base station comprising:
  a receiver operable to receive a data packet from the mobile terminal,
  a processor operable to determine whether the received data packet has been successfully received,
  wherein the processor is operable to determine whether the interference level is above or equal to a predetermined threshold interference level, if processing means has determined that the data packet has not been successfully received,
  a transmitter operable to transmit a feedback message to the mobile terminal, if processing means has determined that the data packet has not been successfully received,
  wherein the feedback message indicates to the mobile terminal that the retransmission will be scheduled, if the determined interference level is above or equal the predetermined threshold, and
  wherein the feedback message indicates to the mobile terminal to transmit a retransmission data packet to the base station after a predetermined time span upon having received said feedback message, if the determined interference level is below the predetermined threshold interference level.

24. A mobile terminal in a wireless communication system wherein a HARQ protocol is used to retransmit data from a mobile terminal to the base station via a data channel, the mobile terminal comprising:
  transmission means for transmitting a data packet to the receiving entity,
  receiving means for receiving a feedback message from the receiving entity,
  processing means for determining whether the feedback message indicates that a retransmission data packet for the transmitted data packet will be scheduled, or to transmit the retransmission data packet to the receiving entity after a predetermined time span upon having received said feedback message,
  wherein the transmission means is adapted to transmit a retransmission data packet for said transmitted data packet to said receiving entity after a predetermined time span upon having received said feedback message or at a scheduled point in time and
  wherein the transmission means are operated in response to said feedback message.

25. A wireless communication system wherein a HARQ protocol is used to retransmit data from a mobile terminal to the base station via a data channel, the system comprising at least one base station according to claim 23 and at least one mobile terminal comprising:
  transmission means for transmitting a data packet to the receiving entity,
  receiving means for receiving a feedback message from the receiving entity,
  processing means for determining whether the feedback message indicates that a retransmission data packet for the transmitted data packet will be scheduled, or to transmit the retransmission data packet to the receiving entity after a predetermined time span upon having received said feedback message,
  wherein the transmission means is adapted to transmit a retransmission data packet for said transmitted data packet to said receiving entity after a predetermined time span upon having received said feedback message or at a scheduled point in time and
  wherein the transmission means are operated in response to said feedback message.

* * * * *